C. T. FRANTZ.

TYPE WRITING MACHINE.

APPLICATION FILED AUG. 2, 1917.

Reissued Dec. 11, 1917.

14,408.

4 SHEETS—SHEET 1.

Inventor:
Charles T. Frantz.
By Jno. Imrie
Attorney

C. T. FRANTZ.
TYPE WRITING MACHINE.
APPLICATION FILED AUG. 2, 1917.
Reissued Dec. 11, 1917.
14,408.
4 SHEETS—SHEET 2.
Fig. 3.
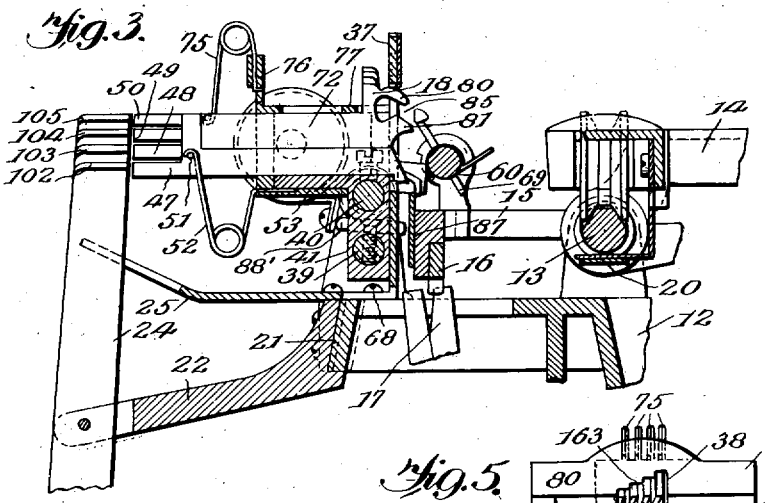
Fig. 5.
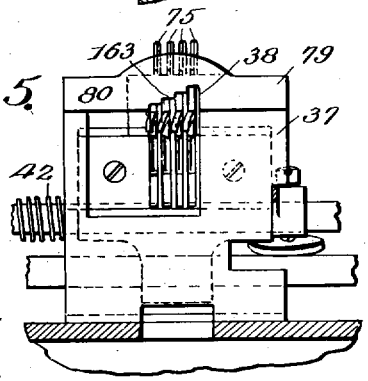
Fig. 5.a
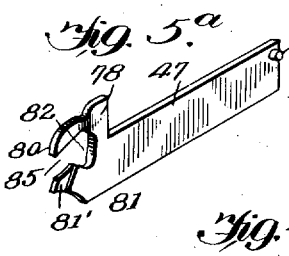
Fig. 4.a
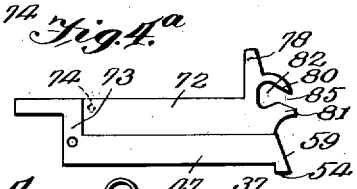
Fig. 4.
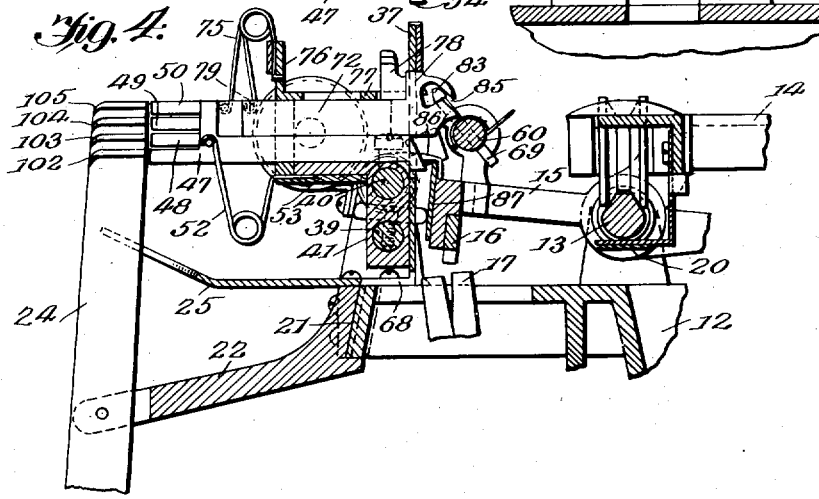
Inventor
Charles T. Frantz.
By Jno. Imrie
Attorney C. T. FRANTZ.
TYPE WRITING MACHINE.
APPLICATION FILED AUG. 2, 1917.
Reissued Dec. 11, 1917.
14,408.
4 SHEETS—SHEET 3.
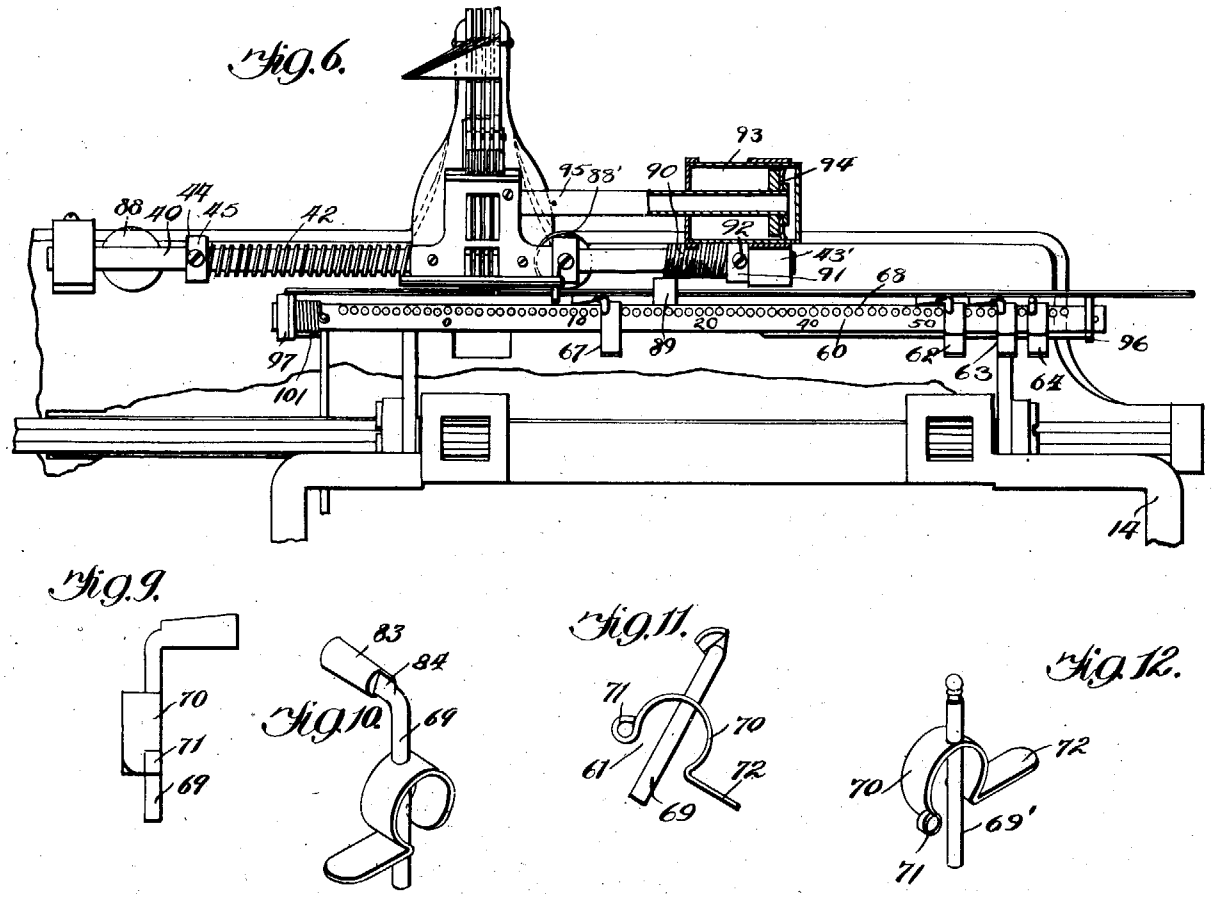
Inventor:
Charles T. Frantz.
By
Attorney:

C. T. FRANTZ.

TYPE WRITING MACHINE.

APPLICATION FILED AUG. 2, 1917.

Reissued Dec. 11, 1917.

14,408.

4 SHEETS—SHEET 4.

Inventor:
Charles T. Frantz.
By Jno. Imrie
Attorney.

UNITED STATES PATENT OFFICE.

CHARLES T. FRANTZ, OF CHICAGO, ILLINOIS, ASSIGNOR TO FRED P. GORIN, OF CHICAGO, ILLINOIS.

TYPE-WRITING MACHINE.

14,408. Specification of Reissued Letters Patent. Reissued Dec. 11, 1917.

Original No. 1,118,339, dated November 24, 1914, Serial No. 496,946, filed May 19, 1909. Application for reissue filed August 2, 1917. Serial No. 184,172.

*To all whom it may concern:*

Be it known that I, CHARLES T. FRANTZ, a citizen of the United States, residing at Chicago, in the county of Cook and State of Illinois, have invented new and useful Improvements in Type-Writing Machines, of which the following is a full, clear, and exact description.

My invention relates particularly to a tabulating attachment to typewriting machines, and one of its objects is the provision of simple and efficient mechanism of this character whereby the carriage may be released from its feeding mechanism, gradually stopped at the end of its run and returned to an exact predetermined point.

A further object of the invention is the provision of a locking-out device in combination with a buffer which will effect a gradual stopping of the carriage at the end of its run and the automatic re-connection of the same with the feeding mechanism only in a predetermined position.

Another object of the invention is the provision of a tabulating attachment for typewriting machines comprising a resilient buffer for relieving the impact of the carriage and automatic apparatus for positively stopping the carriage exactly in a predetermined position.

Other objects of the invention will appear hereinafter, the novel combinations of elements being set forth in the appended claims.

Figures 1, 2:
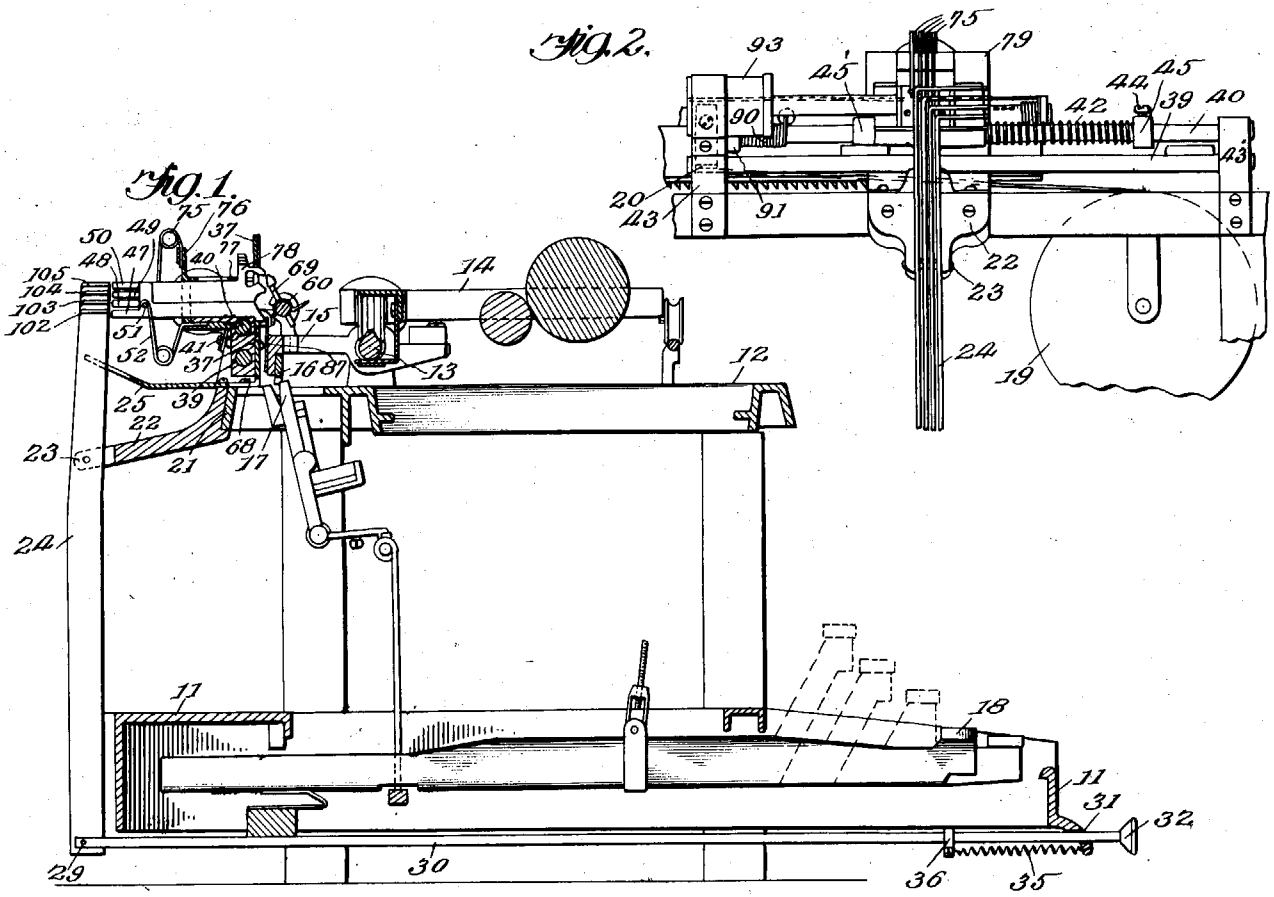
Figure 7:
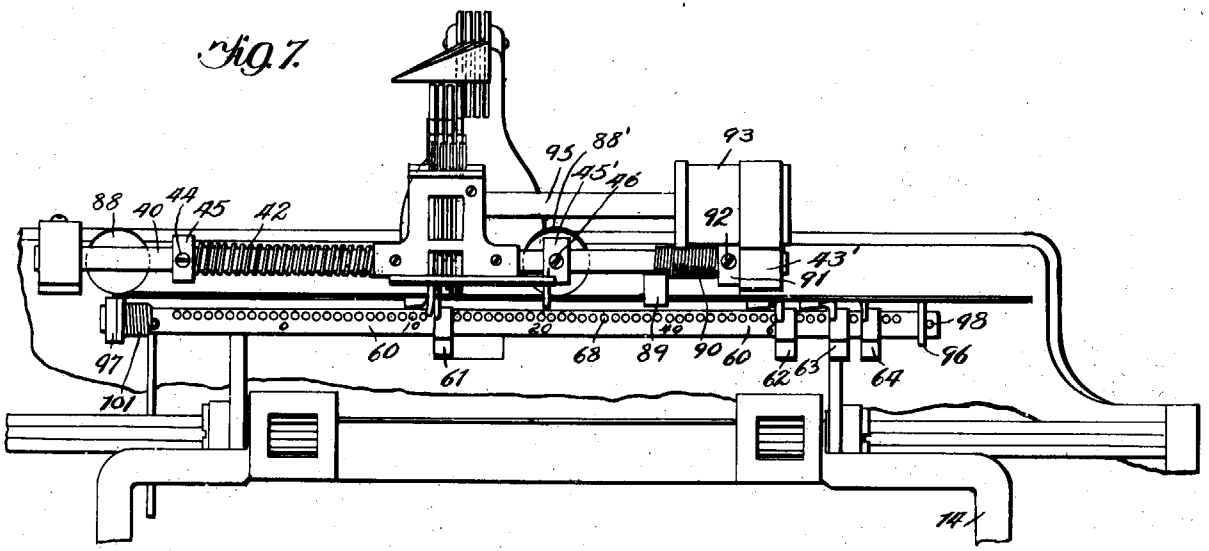
Figure 8:
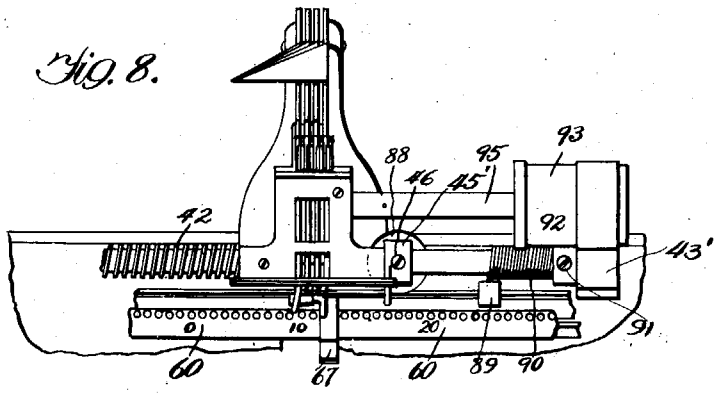
Figure 7A:
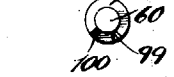

In the accompanying drawings, Figure 1 represents a transverse sectional elevation of an ordinary typewriter with my invention applied thereto; Fig. 2 is a fragmentary rear view of Fig. 1, showing the usual main motor spring of the typewriter; Fig. 3 is an enlarged sectional elevation of a portion of Fig. 1; Fig. 4 is a similar view but showing the carriage disconnected from the spacing dogs; Fig. 4ª is a detail view; Fig. 5 is a front elevational view of the improved locking-out mechanism broken away from the typewriting machine; Fig. 5ª is a perspective view of one of the upper plungers; Fig. 6 is a fragmentary plan view showing the buffer spring and locking-out mechanism in the position assumed while the typewriter is being used for writing continuously; Fig. 7 is a similar view showing the position of parts after a tabulator key has been actuated and the buffer spring is in the act of relieving the impact of the carriage; Fig. 7ª is a detail end view of the stop rod; Fig. 8 is a view showing the position of the parts while the carriage is rebounding beyond its stopping point; and Figs. 9 to 12, inclusive, are enlarged views of my improved adjustable stop devices.

Like reference characters designate similar parts throughout the various views.

Referring to the drawings, 11 designates the base of the typewriting machine, 12 the table of the supporting frame, 13 the back bar of the carriage 14, to which the latter is pivoted and along which it slides in the usual way. Pivoted to the back bar 13 independently of the carriage but connected to move therewith is a frame 15 which carries the escapement rack 16. Coöperating with this rack are spacing dogs 17 which are connected to spacing keys 18. Under the action of the main spring 19, which is connected in any desired manner at 20 to the carriage 14, the latter is fed step-by-step under the control of the spacing mechanism. These parts are constructed and operated in a manner well understood in the art to control the movement of the carriage while operating the typewriter keys in the ordinary way.

I will now describe the selective stop mechanism for use in tabulating or writing in columns. To the back of the table 12 at 21 is rigidly connected an annular bracket 22, to the outer end of which are pivoted at 23 the motion-transmitting levers 24, four of which are in this instance shown, although the number may be varied as desired. That is to say, one of such levers may be used, alone, or two or more of them may be used, depending upon the operation desired. These levers are suitably spaced apart and guided by means of a slotted bracket 25 which is rigidly attached to the upper end of the annular bracket 22 to occupy a slightly inclined position. To the lower end of each lever 24 is pivoted at 29 a push rod 30 which extends along under the machine through guide openings 31 to the front of the machine and to the outer ends of the rods are connected the keys 32. If desired springs 35 may be used for holding the rods 30 and levers 24 in initial position, as shown, with the levers 24 against the back of the frame 11. Each of these springs is connected at one end to the front plate of the frame 11 and at the other end to the rod 30 at 36. If desired the springs 35 may be omitted and the springs 75 and 52 depended on to restore the levers 24 and rods 30 to initial position as hereinafter explained.

Fixed to the rear of the table 12 at 68 is an angular plate 37 which is provided with an opening 38 of special contour, as indicated in Fig. 5. If desired, a reinforcing plate 79 may be fastened across the top of the plate 37 as shown in Fig. 5. The plate 37 is an important feature as it effects the stopping of the carriage at exactly the point predetermined. This plate is rigidly fixed to the frame of the typewriting machine as are also the horizontal guide plate 25 and the supporting bracket 22, and therefore these parts never move while the plate 37 is acting as the locking-out plate.

Back of the plate 37 are two longitudinal rods 39 and 40, the ends of which are rigidly attached to the rear of the table 12 of the typewriter frame. These rods extend parallel to the escapement rack bar 16 and the back pivot bar 13 of the machine, and are for the purpose of guiding and supporting the buffer block 41. The upper rod 40 also carries the buffer spring 42 between one end of the buffer block 41 and the slidable ring 45, the latter being used in connection with a set-screw 44 to adjust the tension of the buffer spring 42. It is evident that the buffer spring 42 tends to move the buffer block to the right, as viewed in Fig. 7, but the extent of this movement is limited by the stopping ring 45′ which may be held in adjusted position by the set-screw 46. As explained hereinafter the buffer block must occupy a certain definite position with respect to the locking-out plate 37 and such position is obtained by varying the position of the limit stop 45′.

As indicated in Fig. 2, the action of the buffer spring is opposed to that of the motor-spring 19 of the typewriter and its tension is adjusted to be sufficiently greater than that of the motor spring to return the carriage to its proper position after the buffer block is struck. The tension of the main spring is also adjustable in the well known manner. With the apparatus herein disclosed the main spring may be adjusted to suit the operator but the spring 42 need not be adjusted so long as its tension is sufficiently greater than that of the main spring to return the buffer block to initial position.

In the upper portion of the buffer block 41 are four vertical slots which may be cut into the material of the block or formed by front and rear combs securely fastened to the buffer block so as to form part thereof. These slots extend from front to rear in the former case and are located at the front and at the rear in the latter case. These slots receive the flat plates or plungers 47, 48, 49 and 50 which perform several functions. Each of these plungers is mounted to slide in its respective slot independently of the others and each is provided with a short laterally extending pin 51. Against each of these pins bears the upper end of a spring 52, there being one spring for each sliding plate or plunger. The other ends of these springs are fastened to the under side of the buffer block 41 by means of the plate 53. The spring tends to move the sliding plates to the rear but such movement is limited by the lugs 54 striking against the front face of the buffer block near the lower edge of the opening 38 in the lock plate 37. The opening 38 is sufficiently large and so shaped that the plate 37 will not interfere with the lateral movement of the plungers whether projected or not.

The front ends of the plungers in the buffer block are each provided with inclined surfaces or cams 59 for engaging and lifting the longtudinal bar or rod 60, which is connected to the escapement rack frame 15 and carries stops or striking members 61, 62 and 63, movable along the rod 60 and capable of being fastened in adjusted positon in the openings 68 of which there are many in a straight line along the rod 60 as indicated in Figs. 6 and 7. These striking members are intended to be set at points corresponding to the predetermined positons where the carriage is to stop in the operation of tabulation. It should be noted that there may be a plurality of such striking members so that the carriage may be stopped at a corresponding number of places, where, for instance, several columns of figures are to be tabulated on a single page. If desired, the tabulator bar 60 may be notched laterally to receive U-shaped stops or striking members, as is well understood by those skilled in the art. Or such striking members may consist of rings capable of being fastened in adjusted position by set screws. I prefer, however, to employ such stops as are shown in Figs. 9, 10 and 11, and for a special purpose one such as shown in Fig. 12. Mounted on a pin 69 is a circularly shaped or inverted U-shaped band 70 of spring metal, one end of which is curled at 71 to form a stop or striker to engage a lower plunger when projected, and the other end 72 of which may be extended outwardly as shown to facilitate the removal by hand of the whole device from the perforated rod 60. By inserting the pin 69 in a transverse opening 68 and pressing the spring loop 70 over the rod 60 the stop 71 will be securely held in a predetermined position to engage a plunger and be released therefrom to effect the stopping of the carriage at the proper point. It will be noticed that the curled stop 71 is flush at one side with the corresponding edge of the band 70 and that the pin 69 is secured to the inverted U-shaped band 70 near the same edge.

When one of the plungers is operated and a cam 59 engages the rod 60 to lift the frame 15 together with the rack bar 16, the latter is disconnected from the escapement pawls 17, whereupon the main spring 19 (Fig. 2) will advance the carriage 14 freely to the left as viewed in Fig. 6, or from the front of the typewriting machine, until one of the stops, as that designated 61, impinges against the outer end of the plunger and through the same transmits motion to the buffer block against the action of the buffer spring 42. Free rebound is permitted and the main spring and buffer spring may be so adjusted that the carriage will be stopped on its return movement at the proper point and the locking-out mechanism operate at such point to cause the reëngagement of the rack bar with the escapement pawls.

In my co-pending application, Serial No. 462,193, filed November 12, 1908, patented Nov. 24, 1914, No. 1,118,338, for improvements in typewriting machines, I have disclosed and claimed buffer mechanism to the plungers of which are integrally connected means for maintaining a projected plunger in engagement with a stop until the carriage returns to the point where it is to stop. In such case, the tabulating key may be released after impact of a stop against a plunger and the latter will return automatically to initial position, although the carriage may rebound farther than intended. I have devised mechanism which will permit release of a tabulating key after impact and automatically restore the parts to normal position even when the carriage rebounds beyond its ultimate stopping point as predetermined by the position of the stop on the rod 60. This mechanism I will now describe.

By referring to Figs. 4 and 4ª it will be seen that I have provided additional plungers or slides 72 one in each of the slots in the buffer block 41, in this instance four in number. These plungers or slides 72 lie loosely in engagement with the plungers 47 and above the same so as to be in front of the extensions 73 of the lower plungers. By means of this construction when the lower plungers are actuated by the lever 24 impinging against the same the extensions 73 will also be thrust forward but the lower plungers may be returned independently of the upper plungers. Each of the upper plungers is provided with a laterally projecting pin 74 for receiving one end of a spring 75, the other end of which is securely fastened to the plate 77 which in turn is fastened to the top of the buffer block 41 to hold the plungers in proper position.

As indicated in Figs. 4 and 4ª each of the upper plungers is provided with a locking lug 78 which initially lies behind the plate 37 or respectively back of the steps at 163. When an upper plunger is thrust forward and the cam 59 receives the blow of the stop 71 the corresponding locking lug will move in front of the plate 79 to the left as viewed in Fig. 5, thus preventing the return of the upper plunger to initial position until the buffer block returns to initial position. The locking lugs of the other upper plungers remain back of the plate 37 and cannot be thrust forward until the buffer block returns. The front portion of the slide 72 is of peculiar shape for a special purpose. A forwardly and downwardly extending finger 80 forms with the thumb 81 an opening or eye 82 in such position that when thrust forward it will lie in the path of movement of the lateral upper extensions 83 of the stop devices. The thickness of each extension is such that when projected into the opening 82 it cannot be withdrawn through the passage between the finger 80 and the thumb 81. Although I wish to depend on the stop 71 to strike against the plunger 47 to transmit motion to the buffer block against the action of the buffer spring, the upper end of the pin 69 may also strike against the head 81 to assist in actuating the buffer block. When the stop 71 strikes the plunger 47 and so long as it remains in engagement therewith the whole of the extension 83 is projected through the opening 82 and the flat narrow neck 84 may ride through the passage 85 with ease when the stop lug 78 returns to its proper position where its spring 75 can move it through the opening 38 under its corresponding step as indicated at 163. If, however, the carriage rebounds too far and the plunger 72 recedes the extension 83 will be prevented from moving through the passage 85. The frame 15 will therefore be held up as shown in Fig. 4 until the main spring again returns the neck 84 to the passage 85 when the neck will slip through and permit the rack 16 to drop into engagement with the pawls 17 to stop and hold the carriage at the predetermined point.

In order to insure greater accuracy in properly directing the rack 16 into engagement with the pawls 17 the fingers 80 are bent to the left as viewed in Fig. 5 and the thumb piece 81 is cut away on its right hand side at 81′ as indicated in Fig. 5ª. The springs 75 tend to return the upper plungers very quickly when permitted to do so and therefore if the fingers 80 were in the same plane as the body portion of the plunger 47 it would sometimes happen that the neck 84 of a stop device would slip through between the thumb and finger before the momentum of the carriage had been overcome and the rebound of the carriage would tend to move the carriage back too far and the rack would reëngage the escapement pawls to arrest the carriage at the wrong point. By bending the fingers to the left as shown, this cannot happen. So long as the buffer block is out of its initial position the locking lug 78 of the projected upper plunger is held against the front surface of the plate 79 and the upper portion of the rod 69 lies against or in close proximity to the thicker part of the thumb 81. Now if, at the time that the buffer block returns to its initial position and the locking lug 78 is moved under its step, there is any tendency for the carriage to move farther to the right the bent finger will engage the extension 83 instead of the neck 84 and therefore the frame 15 will be kept from descending at such time. When the carriage is again moved to the left by the main spring, the upper portion of the pin 69 engages the cut-away portion 81′ of the thumb piece and stops the carriage for an instant. When this takes place the under surface of the finger 80 acting as a cam engages the neck 84 to force down the rack frame to insure quick reëngagement of the rack with the escapement pawls to arrest the carriage at exactly the point desired in every instance.

If desired, the adjustable stop collar 45′ may be provided with a forwardly and downwardly extending abutment 86 adapted to be struck by the upper edge of the strip 87 which is fastened to the back of the rack-carrying frame. This prevents the members 83 from being lifted out of alinement with an opening 82 when a loose plunger is projected forward. However, this construction may be omitted and the limit of movement of the key 32 against the front plate of the frame 11 depended on to limit the distance that the rod 60 will be lifted. Furthermore the frame 15 may be urged to its lowermost position by means of the spring 90 acting on the roller 89 which is above the strip 87. This spring may be adjusted in position and tension by the collar 91 and set screw 92. If desired, rollers 88, 88′ may be provided against which the strip 87 may bear at times to facilitate quick movement of the carriage when jumping from one position to another. It should also be noted that I provide a dash pot 93 which, however, in some instances may be omitted. This dash pot is connected rigidly to the support 43′, its piston 94 being connected to the rod 95 which in turn is connected to the buffer block. The dash pot mechanism is so arranged as to permit free movement of the buffer block against the action of the buffer spring 42 but cushions its return movement. It should also be noted that the rod 60 is mounted in brackets 96, 97 and prevented from moving longitudinally in any suitable manner as by means of the pin 98 and the abutment 99. The latter has a limited movement in the slot 100 and determines the extent of oscillatory movement of the rod 60. A spring 101 one end of which is connected to the rod 60 and the other end of which is connected to the bracket 97 holds the stop devices normally in an inclined position, as shown, the member 99 extending from one of the ends of the rod 60 resting against the right side of the slot 100 as viewed in Fig. 7ª. I have provided means for permitting an oscillatory movement of the rod 60 to prevent interference with the movement of the plungers. Otherwise such interference might happen where it is desired to tabulate at short distances. At the right of Fig. 6 I have shown the stop devices 62 and 63 close together, for tabulation within a few letter spaces. To get the closest tabulation I place a stop with a straight pin 69′ as shown in Fig. 12 to the right of a stop with an extension 83. In such case the extension is unnecessary as there will be no appreciable rebound of the carriage. The upper end of the rod 69′ will rest against the thumb 81 until the latter is withdrawn when the carriage will be arrested in the proper position. As indicated in Fig. 6 the stop devices 62, 63 and 64 have been set to stop the carriage at points corresponding to 63, 68 and 71 on the front scale. The gradual stopping of the carriage by the stop device 62 has already been described. Now, upon printing two figures the carriage will be moved to the left two spaces and the extension 83 of the stop device 63 will be in front of the plungers at the extreme right. Now, upon actuating the extreme right-hand tabulating key the upper plunger projected will engage the extension 83 of the stop device 63 and oscillate the rod 60 while the cam of the lower plunger lifts the same and allows the carriage to move to the left until the cut-away portion 81′ is engaged by the upper portion of the rod 69 when the carriage will be stopped and when the plungers are withdrawn the carriage will stop at point 68. Upon again actuating the same key, the thumb 81 will engage the pin 69 of the stop device 63 and oscillate the rod 60 while the cam of the lower plunger will lift the rod to cause the carriage to jump to the left. The upper end of the pin 69′ will engage the thick portion of thumb 81 and when the plungers recede the pin will engage the cut-away portion 81′, after which the carriage will be stopped at the point 71.

Only a few parts have been added to the carriage to move therewith. The added momentum due to the tabulator attachment is therefore reduced to a minimum. Although the tabulator is herein shown connected to a typewriting machine of the ordinary type, it should be understood that it may be applied to other kinds of typewriters, the type herein shown being merely by way of illustration of the invention.

The operation of the tabulator may be more fully explained as follows: During the ordinary operation of the typewriter, the keys 18 are struck and the type bars operated in the usual way to effect the advance of the carriage step-by-step by means of the main spring 19 and the escapement mechanism. When tabulations are to be made accurately and in a minimum space of time, the various parts are properly adjusted and one of the auxiliary keys 32 then actuated. In the construction illustrated four such keys are intended to be used but it should be understood that only one such auxiliary key would be used where only one set of stopping plungers is employed. I have shown a series of four sets of such plungers and therefore there should be four keys, one corresponding to each set of plungers. Furthermore, if two or more sets of plungers are used they should be spaced apart such a distance that the lateral face of one plunger is a letter space distance from the corresponding lateral face of the next succeeding plunger. As shown, I have in this instance made each of the lower plungers flat throughout but the fingers 80 of the upper plungers are bent to the left as indicated in Figs. 5 and 5[a]; and the thumbs 81 are cut away on the right-hand side.

I will now explain the various adjustments which should be made to effect the operation desired. If a column of figures is to be written the carriage is first set at the desired point where the first numeral is to be written and while held in such position the stop 61 is inserted in the proper hole 68 which is marked to scale corresponding to the front index scale on the machine. For instance, if it is desired that the carriage shall stop at 20, the pin 69 or 69′ is inserted in the hole 68 marked 20. Then if the right-hand tabulator key is operated, the carriage will jump to the left and stop at 20. As arranged the apparatus is convenient for tabulating columns of figures of hundreds, tens, units and decimal points, so that when the right-hand key 32 is actuated, the carriage will jump to the hundreds place and three figures, a decimal point, and two more figures may be written. By pushing the next key to the left, the carriage will stop at the tens place; by operating the third key from the right the carriage may be stopped at the units place; and by operating the extreme left-hand key the carriage will stop in the position corresponding to the decimal points. After one set of figures in one column are written, one or more sets of figures may be written for succeeding columns on the same page in the same line. For instance, after operating one of the tabulating keys and writing the figures for the corresponding column, one of such keys may be operated again to secure a further jumping of the carriage so that another striking member, as that designated 62 on the rod 60, will impinge against a plunger of the stopping mechanism to effect a stopping of the carriage at the desired point for the figures in the next column. The other striking devices 62, 63 and 64 are adjusted in the same manner by insertion in the openings 68 which are a letter space distance apart. As before explained the stop device having the straight pin 69′ is used for securing accurate tabulation in vertical columns of figures only a short distance from each other.

Preferably the main spring is first adjusted to have the proper tension for operating the carriage step-by-step with a force to suit the operator. The tension of the buffer spring 42 is then adjusted so as to be only as much stronger than the main spring as is necessary to bring the buffer block, stop plunger and carriage back to the position where the connection between the escapement rack bar and the escapement pawls is to be reëstablished. That is to say, the buffer spring is put under such tension that after gradually stopping the carriage the latter will be returned by it against the action of the main spring and be brought to a stop at or about the time that the upper plunger can return to initial position. As soon as the stop device strikes the projected plungers, the tabulator key may be released and the lower plunger immediately returns to initial position. After the key is released the operation of restoring the parts to proper position is entirely automatic. If the stop bounces back too far the thumb and finger of the upper plunger holds the escapement frame up until the stop device again returns against the lateral face of the plunger where the neck 84 can slip through between the thumb 81 and finger 80. The construction may be such that the pin 69 first strikes against the thickest portion of the thumb 81 and if the carriage bounces back too far, the thumb and finger acting on the enlarged extension 83 keeps the escapement frame from falling. When the pin 69 returns to the left again it engages the cut-away portion in the right-hand side of the thumb because after the first impact the plunger returns to registering position with respect to its slot in the plate 79 and retreats slightly into the same until stopped by the inner surface of the bent finger 80 contacting with the enlarged extension 83, as clearly shown in Fig. 4, and the bent finger immediately above being urged to the rear by the spring 75 acts as a cam to force the stop device bar 60 and frame 15 down. Therefore when the parts are in condition for the carriage to be stopped, the escapement rack will be moved very quickly to engaging position. The upper plunger can return from its position as shown in Fig. 4 to its normal position only when the pin 69 is against the cut-away portion 81′, in the right hand side of the thumb 81 because when the parts are in that position only will the extreme end of the bent finger clear the enlarged portion 83 and pass over the neck 84 due to the fact that the finger is bent out of the vertical plane of the thick portion of the thumb 81, the effect of which is to produce a stepped escapement of the stop pin 69 when it is being released from the plunger. It will therefore be seen that a tabulator key may be operated to effect a jumping of the carriage approximately to the proper position where it will be stopped gradually and finally stop at the exact point desired without any loss of time whatever, as immediately after the impact occurs the key may be released the rest of the operation being entirely automatic.

The buffer spring must be sufficiently strong under any circumstances to return the carriage to the position where the locking lug 78 can slip under its stop in the locking plate 37. The buffer spring should therefore be adjusted to return the buffer block and carriage to such position that the former will abut against the limit stop 45′ on the rod 40. As before stated, a dash pot 93 may be used to cushion the return movement of the buffer block to initial position. The tension of the spring 42 may be varied by sliding the ring 45 along the rod 40 and fastening it in the adjusted position by means of the set screw 44, and the position of the abutment 45′ may be varied in a similar manner. It will be evident that even if the buffer spring is set to have too great a tension with respect to the main spring so that the buffer spring tends to recoil too strongly, the construction which I have devised comprising the thumb and finger catch and the extension 83 will nevertheless effect the stopping of the carriage at the exact point desired. A nice balance between the buffer spring and the main spring need not therefore be maintained but the main spring may be adjusted to suit the operator and the buffer spring let alone so long as it is sufficiently strong to return the buffer block against its stop 45′.

If the buffer spring and main spring are approximately balanced, in some instances the thumb and finger need not be depended upon. Or stop devices having straight pins 69′ only may be used. In such event, the tabulating keys should be kept depressed until the carriage is stopped in the proper position. It will be observed that when the buffer block is struck it will move to the left carrying the plunger with it. The upper ends of the levers 24 are provided with wings 102, 103, 104 and 105 extending to the left to engage respectively with the plungers 47, 48, 49 and 50 which are arranged in steps as shown in Figs. 3 and 4. If any key is actuated the corresponding plunger will be thrust forward and its rear extension will remain in engagement with the corresponding wing until the key is released, without interfering with any other extension or wing.

Although I have shown the vertical width of the opening 38 as uniform and the vertical width of the right hand portion of the opening 38 as variable, as indicated, I wish it to be understood that I do not desire to be limited to this exact construction, as such openings may be made of various shapes or contour. So also those skilled in the art may make various changes in the details and arrangement of other parts without departing from the spirit and scope of my invention as defined by the claims and I wish, therefore, not to be limited to the precise construction herein disclosed.

Having thus fully disclosed my invention, what I claim and desire to have protected by Letters Patent of the United States is—

1. The combination in a typewriting machine, of a tabulator attachment comprising a resilient buffer for the carriage, a dash pot for retarding its rebound, and automatic means for arresting said carriage in a predetermined position after rebounding.

2. In a typewriting machine, the combination with a resilient buffer, of a buffer block associated therewith, a double plunger, and a locking plate coöperating with said plunger.

3. In a typewriting machine, the combination with a resilient buffer, of a double plunger, a carrier for said plunger, and a locking plate coöperating with said plunger.

4. In a typewriting machine, the combination with a resilient buffer, of a double plunger, a carrier for said plunger, a locking plate coöperating with said plunger, and means for restoring said plunger to initial position.

5. In a typewriting machine, the combination with a resilient buffer, of a double plunger, a carrier for said plunger, a locking plate coöperating with said plunger, means for moving said plunger to operative position, and automatic mechanism for restoring said plunger to initial position.

6. In stop devices for tabulator attachments, the combination of a spring-pressed oscillatory perforated rod, and one or more stop devices comprising inverted U-shaped metal bands or springs fitting over and around said rod and pins connected to said bands and insertible in the perforations.

7. In tabulator attachments for typewriting machines, the combination with a perforated rod, of a member fitting over and around said rod and provided with a stop or striker, and a pin connected to said member and insertible in the rod.

8. In a tabulator attachment for typewriting machines, the combination with an inverted U-shaped spring member provided with a striking portion, of a pin connected to said member, and a lateral extension connected by a narrow neck to said pin.

9. In tabulator attachments for typewriting machines, the combination with a stop device movable with the carriage, of a buffer block, a plunger carried by said block, a key and connections for actuating said plunger to interpose the same in the path of said stop device, a buffer spring, an additional plunger, and means co-acting with said last-named plunger to effect the stopping of the carriage in a predetermined position.

10. In tabulator attachments for typewriting machines, the combination with one or more stop devices movable with the carriage, of a spring-pressed plunger, a spring-pressed buffer block carrying said plunger, an additional spring-pressed plunger, a tabulator key and connections for moving both plungers forward and thereby disconnecting the carriage from the feeding mechanism and interposing one of the plungers in the path of movement of a stop device and means co-acting with the other plunger to effect the arrest of the carriage at a predetermined point.

11. In tabulator attachments for typewriting machines, the combination with a striker movable with the carriage, of buffer mechanism comprising a plunger, a tabulator key and connections for actuating said plunger to cause the same to disconnect the carriage from the feed mechanism and also interpose itself in the path of said striker, an additional plunger having a forward movement with said first-named plunger but having an independent rearward movement, and means co-acting with said additional plunger to prevent the carriage from being reconnected to its feeding mechanism until it stops in a predetermined position.

12. In tabulator attachments for typewriting machines, the combination with a movable carrier, of a buffer spring holding the same in initial position, a spring-pressed plunger normally held in its rear position, a tabulator key and connections for thrusting said plunger forward to cause the same to disconnect the carriage of the typewriting machine from its feeding mechanism, a striker movable with said carriage and arranged to engage said plunger and transmit the force of the impact to said buffer spring to stop the carriage gradually, an additional spring-pressed plunger movable forwardly with the first named plunger but having an independent rearward movement, a stop lug carried by said additional plunger, a locking plate preventing the return of said additional plunger to initial position until the carriage returns to the position where the striker engaged the first-named plunger, and an extension on said additional plunger for maintaining the carriage disconnected from its feeding mechanism independently of said first named plunger.

13. In tabulator stop mechanism, the combination with a carrier, of a lower plunger and an upper plunger mounted in said carrier, a buffer spring, springs holding said plungers initially in their rearward positions, a cam connected to the front end of the lower plunger, a locking plate, a locking lug on the upper plunger, and a cam on the front end of the upper plunger.

14. In tabulator stop mechanism, the combination with a buffer block, of two parallel rods carrying said block, an adjustable buffer spring on one of said rods, an adjustable stop for said buffer block, a fixed locking plate in front of said block, a spring-pressed cam and abutment plunger movable through an opening in said locking plate, an additional spring-pressed plunger immediately above the first-named plunger and movable forward therewith through said opening but having an independent rearward movement, a cam extension on the front end of said upper plunger, and a locking lug to prevent the return of said upper plunger when the block is out of initial position.

15. In tabulator attachments for typewriting machines, the combination wtih a stop device movable with the carriage and comprising an enlarged lateral extension and a narrow neck, of buffer mechanism comprising a plunger having a thumb and finger for catching or holding such extension until the carriage stops in a predetermined position, and means for disconnecting the carriage from its feeding mechanism and bringing the buffer mechanism into play.

16. In tabulator attachments for typewriting machines, the combination with a stop device on a rod movable with the carriage and comprising an enlarged extension and a narrow neck, of a buffer spring, a buffer block, one or more plungers for engaging said rod to disconnect the carriage from the feed, a tabulator key and connections for actuating a corresponding plunger, and a loose plunger above the first-named plunger, and provided with a thumb and finger for catching said enlarged extension, the finger being bent laterally and the thumb having a portion of one of its lateral faces cut-away to prevent the reconnection of the feed before the carriage stops in a predetermined position.

17. In tabulator attachments for typewriting machines, the combination with a stop device, of a rod carrying the same and movable with the carriage, a lateral extension connected to said stop device by a flat narrow neck, a buffer spring, a buffer block, a cam plunger, a tabulator key and connections for actuating said plunger to cause the same to disconnect the carriage from its feed and allow the main motor spring to jump the carriage until the stop device strikes the plunger and the carriage is stopped gradually by the buffer block and buffer spring, and an upper plunger having a bent finger and a thumb with a portion cut away, to catch the aforesaid lateral extension and hold the stop rod until the carriage stops in a predetermined position.

18. In carriage stops for typewriters, the combination with a fixed rod, of a resilient buffer, a buffer block slidably mounted upon said rod, a double plunger carried by said buffer block, and a fixed locking plate cooperating with said plunger.

19. In carriage stops for typewriters, the combination with a rod adapted to be secured to the typewriter frame, of a locking plate adapted to be fixed to said frame, a buffer block slidable on said rod, a buffer spring on said rod, a double plunger carried by said block and coöperating with said locking plate, means for moving said plunger to operative position, and mechanism for automatically restoring said plunger to initial position.

20. In a tabulator for typewriting machines, the combination of means for releasing the step-by-step feed in a typewriter with coöperating stops on the typewriter frame and on the carriage respectively, one of which is adapted to be projected into the path of the other to arrest the carriage, a cushion to relieve the impact of the carriage when said stops collide, and a locking out device coöperating with said stops, said locking out device including a thumb and a hooked finger on one of said stops and out of alinement with each other, a recess in said thumb and a relatively thin neck upon the other of said stops whereby the projected stop is gradually released from the other stop and said step-by-step feed positively forced into reëngagement by said hooked finger.

21. In a tabulator for typewriting machines, the combination with means for disengaging the letter feed of the typewriter, and stops on the typewriter frame and carriage respectively to arrest the carriage when the said letter feed is disengaged, with means for locking said stops with each other, means for gradually unlocking the same, and means for positively forcing said letter feed into reëngagement at a predetermined point.

22. In a tabulator for typewriting machines, the combination with means for disengaging the letter feed of the typewriter, of stops for arresting the carriage when said letter feed is disengaged, and automatic means for gradually and positively reëngaging said letter feed at a predetermined point.

23. In a typewriting machine, the combination with a movable carriage, of stop mechanism comprising a cushion for relieving the force of the impact of the carriage, means for absorbing the recoil imparted to the carriage, and locking-out mechanism for positively stopping the carriage at a selected point.

24. In a typewriting machine, the combination with a movable carriage, of stop mechanism for determining the point at which the carriage is to be stopped, a cushion for relieving the force of the impact of the carriage when engaged by the stop mechanism, and resilient means for absorbing the recoil imparted to the carriage by the cushion.

25. In a typewriting machine, the combination with a movable carriage, motor mechanism therefor, step-by-step spacing mechanism, stop mechanism for determining the point at which the carriage is to be arrested, a cushion for relieving the force of the impact of the carriage when engaged by the stop mechanism, and means for positively absorbing the recoil imparted to the carriage by the cushion.

26. In a selective stop mechanism for typewriter carriages, the combination with step by step feeding mechanism, a stop, an abutment coöperating with the stop to arrest the carriage in its advanced movement, a key for operating said abutment and to disengage the carriage from the step by step feeding mechanism, a cushion for relieving the force of the impact of the carriage when said abutment is operated to engage with the stop, an air cushion device to absorb the recoil of the carriage due to the action of said cushion, and means for positively restoring the carriage to engage the step by step feeding mechanism.

27. In a typewriting machine, the combination with a movable carriage, step by step feeding mechanism, motor mechanism for the carriage, stop mechanism for determining the point at which the carriage is to be stopped, means for disengaging the step by step feeding mechanism, a cushion for relieving the force of the impact of the carriage when engaged by the stop mechanism, resilient means for absorbing the recoil imparted to the carriage by the cushion, and means for positively restoring the carriage to engage the said step by step mechanism.

28. In a tabulating attachment for typewriting machines, the combination with a movable carriage, of stop apparatus, a cushion for relieving the force of the impact of the carriage when the stop apparatus is operated, means for automatically locking out the letter-feed mechanism of the typewriter when a predetermined stopping point is reached and so maintaining the same until the carriage comes to rest at such predetermined point, and means for automatically reconnecting the letter-feed mechanism when the carriage stops at such predetermined point.

29. In a tabulator attachment for typewriting machines, the combination with means for disconnecting the feed mechanism of a typewriter and permitting the carriage to skip toward a predetermined point, of resilient buffer mechanism for gradually stopping the carriage and returning it to such predetermined point, means for automatically locking-out the letter feed mechanism of the typewriter during the gradual stopping and return of said carriage, and means for automatically reconnecting the letter feed mechanism at such predetermined point.

30. In a tabulator attachment for typewriting machines, the combination with a movable carriage, of stop apparatus, a cushion for relieving the force of the impact of the carriage when the stop apparatus is operated, means for automatically locking-out the letter feed mechanism for the typewriter when a predetermined point is reached by the carriage and so maintaining said letter feed mechanism until the carriage comes substantially to rest at such predetermined point, and means for automatically restoring the letter feed mechanism to hold the carriage at rest at such predetermined point.

31. In a typewriting machine, the combination with resilient buffer apparatus, of tabulator stop mechanism, and a locking out device coöperating with said tabulator stop mechanism, said locking-out device including a stepped escapement.

32. In a tabulator for typewriting machines, the combination of means for releasing the step by step feed of a typewriter with coöperating stops on the typewriter frame and on the carriage respectively, one of which is adapted to be projected into the path of the other to arrest the carriage, a cushion to relieve the force of the impact of the carriage when said stops collide, and a locking-out device coöperating with said stops, said locking-out device including a stepped escapement for gradually restoring said step by step feed at a predetermined point.

33. In a typewriting machine, the combination with a movable carriage, of stop mechanism, step by step spacing mechanism, means for disconnecting the step by step spacing mechanism to permit the carriage to skip and engage said stop mechanism, means for cushioning the impact of the carriage against said stop mechanism, means for cushioning its recoil, and automatic mechanism for locking out said step by step spacing mechanism until the carriage comes to rest at the position designated by the stop mechanism.

34. In a typewriting machine, the combination with a movable carriage, of tabulating mechanism comprising a plurality of adjustable stops equally spaced apart from each other, a cushion to relieve the impact of the carriage moving in letter feed direction and engaging one of said tabulator stops, means for limiting the rebound of the carriage, means for automatically locking out the letter feed of the typewriter after the impact between the carriage and one of the tabulator stops, and means for automatically restoring the said tabulator stops to initial position and reconnecting the letter feed of the typewriter to stop the carriage at the point predetermined by said tabulator stop.

35. In a typewriting machine, the combination with a movable carriage, of motor mechanism and step by step spacing mechanism therefor, a tabulator stop, a tabulating key for releasing the step by step spacing mechanism and permitting the carriage to be moved freely and automatically by said motor mechanism until the said tabulating stop is engaged by said carriage and while said tabulating key remains depressed, a cushion to relieve the impact of the carriage after said tabulating stop is engaged, means for automatically locking out the step by step spacing mechanism of the typewriter after such impact of the carriage, such locking-out means operating automatically and independently of the tabulator key after the impact, and means independent of the type keys or the tabulator key for automatically reconnecting or restoring the step by step spacing mechanism when the carriage stops within a letter space from the point where the tabulating stop is engaged by the carriage.

36. In a typewriting machine, the combination with a movable carriage, of tabulating mechanism comprising a plurality of stops, a cushion to relieve the impact of the carriage against one of said stops when the carriage moves freely and automatically in letter feed direction, means for automatically locking-out the letter feed of the typewriter at and after the time that the carriage engages one of said stops and until the carriage returns to the point where it engaged said stop, and means for automatically reconnecting the letter feed of the typewriter only when the carriage has been returned by the cushion to substantially the same position relatively to the typewriter frame as was occupied when the tabulator stop was first engaged by the carriage.

37. In a typewriting machine, the combination with a movable carriage, of tabulating mechanism comprising decimal stops, a cushion to relieve the impact of the carriage against any one of said stops after the carriage skips freely and automatically in letter feed direction and contacts with one of said stops, means for automatically locking out the letter feed of the typewriter after the impact between the carriage and one of said stops, and means for automatically restoring the letter feed of the typewriter when the carriage returns to the point where it engaged one of said stops.

38. In a typewriting machine, the combination with a movable carriage, of tabulating mechanism comprising decimal stops, a cushion to relieve the impact of the carriage against any one of said stops after free and automatic skipping of the carriage in letter feed direction and after engaging one of said stops, means for automatically locking out the tabulating mechanism and holding the letter feed mechanism disconnected from the time the impact takes place until the carriage returns to the point of impact, means for automatically unlocking the tabulator mechanism, and means for positively reconnecting the letter feed mechanism.

39. In a typewriting machine, the combination with a movable carriage, of tabulating mechanism comprising a plurality of decimal stops, a cushion to relieve the impact of the carriage against any one of said stops in letter feed direction, means for limiting the rebound of the carriage, means for automatically locking out the letter feed mechanism of the typewriter after the impact and until the carriage returns to the point of impact, means for automatically releasing the locking-out means, and means for positively restoring the letter feed of the typewriter to normal position when the carriage comes to rest within the letter space from the point indicated by the operated stop of the tabulator mechanism.

40. The combination with a typewriting machine, of tabulating mechanism comprising stops on the typewriter frame and the carriage respectively, which are adapted to coöperate with each other to arrest the carriage, a cushion to relieve the impact of the carriage when said stops engage, and safety mechanism for taking the carriage out of the control of its escapement and locking it in such condition after the carriage has passed the point of impact and until it returns thereto, and means for restoring the control of the carriage to the escapement feed when the carriage momentarily stops at said impact point upon its return thereto.

41. The combination with a typewriting machine comprising escapement feed and a carriage, of tabulating mechanism comprising stops on the carriage and the typewriter frame respectively, which collide with each other to arrest the carriage when the escapement feed is released, a cushion to relieve the impact of the carriage when the stops collide, safety mechanism for locking the carriage out of the control of its escapement feed from the time of the collision of said stops and while the carriage is moving forward and returning until the carriage rests momentarily in a predetermined position, and means for automatically unlocking the safety mechanism and restoring the escapement feed to stop the carriage at such predetermined position.

42. The combination with a typewriting machine comprising a frame, a carriage and escapement feed, of a tabulating mechanism comprising stops on the typewriter frame and carriage respectively, means for releasing the escapement feed and causing the carriage to skip in letter feed direction until said stops collide, a cushion to relieve the impact of the carriage when the stops collide, a safety mechanism for locking the carriage out of the control of its escapement feed during the compression of said cushion and only until the same has fully expanded to the point of collision of said stops, and means for automatically restoring the escapement feed when the carriage momentarily rests at the point of collision upon its return thereto.

CHARLES T. FRANTZ.

Witnesses:
E. T. Hanson,
S. Orb.